W. W. POPE.
METHOD OF REMOVING STUMPS.
APPLICATION FILED MAR. 10, 1910.
1,082,442.
Patented Dec. 23, 1913.
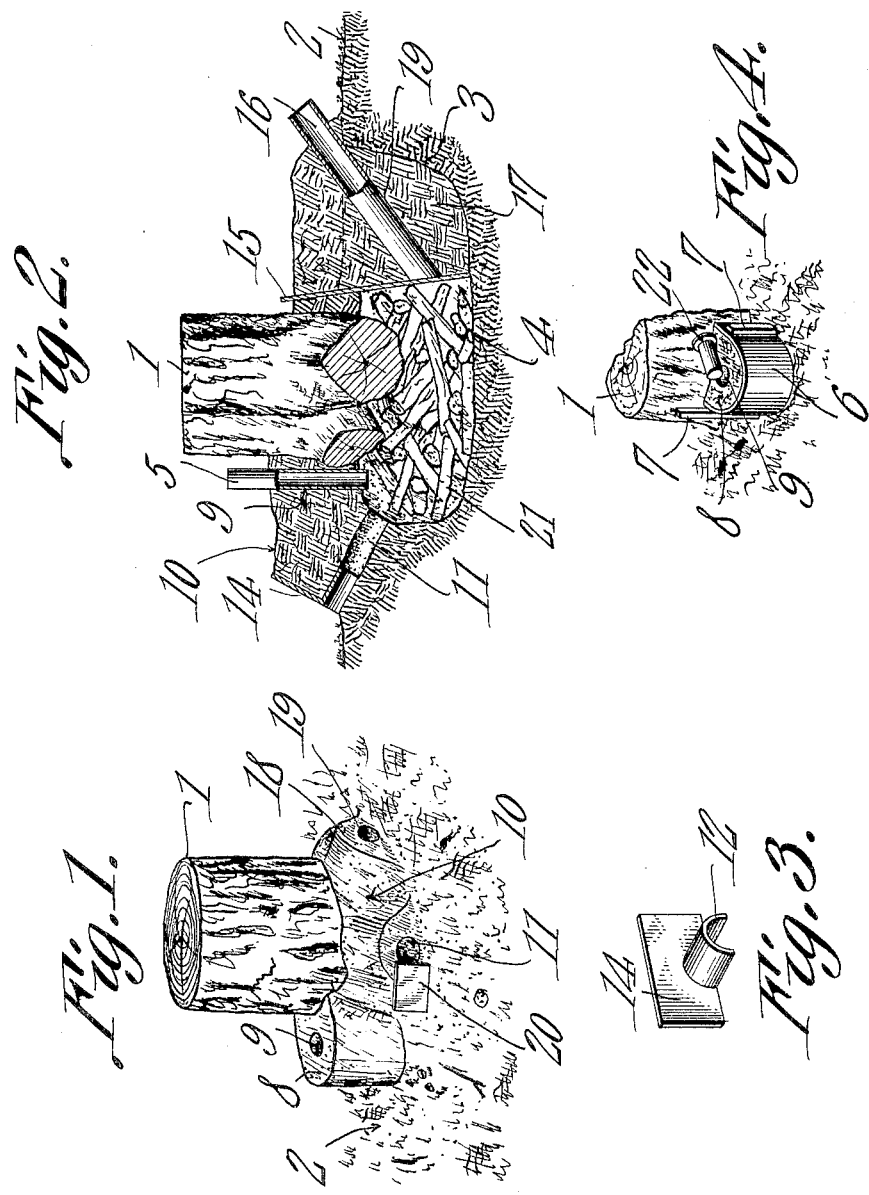
Witnesses
Mason B. Lawton
Inventor
William W. Pope.
By C. A. Snow & Co.
Attorneys

UNITED STATES PATENT OFFICE.

WILLIAM W. POPE, OF TYLERTOWN, MISSISSIPPI.

METHOD OF REMOVING STUMPS.

1,082,442.  Specification of Letters Patent.  Patented Dec. 23, 1913.

Application filed March 10, 1910. Serial No. 548,428.

*To all whom it may concern:*

Be it known that I, WILLIAM W. POPE, a citizen of the United States, residing at Tylertown, in the county of Pike and State of Mississippi, have invented a new and useful Method of Removing Stumps, of which the following is a specification.

It is the object of this invention to provide a novel method whereby an earth-embedded stump may be removed without the use of expensive tools, and with a minimum expenditure of labor.

Another object of the invention is to devise a method whereby the combustible material which is employed in consuming the stump, may be so placed that the combustible material, as it burns, will have a maximum efficiency in consuming the stump.

Another object of the invention is to devise a method whereby those portions of the stump which are consumed, will rapidly drop away, to permit the unconsumed portions of the stump to be attacked by the flames.

Another object of the invention is to provide a method whereby the combustible material beneath the stump may be readily ignited, and readily controlled as it is burning.

With the above and other objects in view, the invention consists in the novel method hereinafter described, illustrated in the drawings, and specifically claimed, it being understood that changes, properly falling within the scope of what is claimed, may be made, without departing from the spirit of the invention.

In the accompanying drawings, Figure 1 is a perspective, showing a stump, about which a furnace has been formed, in which the hereindescribed method of consuming the stump, may be carried out; Fig. 2 is a transverse section of a stump embedded in the earth, the view being designed to show the manner in which the excavation beneath the stump is formed, and the manner in which the draft openings are fashioned, the several draft openings being shifted slightly from the positions in which they are depicted in Fig. 1, in order that all of the said draft openings may be disposed in the common cutting plane; Fig. 3 is a detail perspective of an element which is employed in fashioning outlets of certain of the openings into the fuel chamber; and Fig. 4 is a perspective designed to show the manner in which one of the draft openings is fashioned, and the earth embedded about said opening, and against the stump.

To carry forward my method under the most favorable circumstances, the work of excavating should be done in a wet season, when the earth may readily be handled without danger of caving in. However, should it be desired to carry on the operation in a dry season, the earth 2 which surrounds the stump 1 may, in the first instance be thoroughly drenched with water.

A shaft 3 is first sunk vertically in the vicinity of the stump 1, the distance of the shaft 3 from the stump 1 being dictated by number and location of the protruding roots of the stump, and by the character of the soil in which the stump is embedded. When this shaft 3 has been excavated to the required depth, a lateral drift 4 is made from the shaft 3. This drift 4 is carried beneath the stump to fashion a fuel-receiving chamber. The base of the stump is exposed to the desired degree at the top of the chamber, and the chamber is prolonged, as shown in Fig. 2, until it extends entirely across the bottom of the stump; or if desired, but a portion of the stump may be exposed at its bottom, the length of the chamber beneath the stump being dictated by the size of the stump and its condition, and by the nature of the soil which is being removed.

After the shaft 3 and the drift 4 have been formed, a boring device of some sort, such, for instance, as a tube 5, is thrust downward through the earth, and made to enter the fuel chamber near the stump. An arcuate plate 6, most clearly disclosed in Fig. 4 is then placed about the tube 5, the ends of the plate 6 abutting against the stump 1. This plate 6 may be retained in place by pins 7 which are driven down into the ground about the plate. Earth is then tamped as denoted by the numeral 8, about the tube 5, and troweled off smoothly upon top. The tube 5 may then be removed, leaving the opening 9, whereupon the plate 6 and the pins 7 are removed, leaving the earth about the opening 9 in the form seen most clearly in Fig. 1.

When the draft openings are alined as shown in Fig. 2, the earth is securely tamped about the exterior of the stump as shown at 10.

By means of the tube 5, or another like boring implement, an inclined opening 11 is made, extended into the fuel chamber near the stump. The tube 5 is then withdrawn from the opening 10, and a trough 12 having a face plate 14, is inserted into the mouth of the opening 11, the earth being tamped against the face plate 15, whereupon the face plate is removed.

One or more plates 15 are introduced into the shaft 3, to cover the mouth of the drift 4, and an inclined tube is located in terminal abutment with the plate 15, as denoted by the numeral 16 in Fig. 2. Previous to the mounting of the plate 15 and the tube 16 in place, the chamber beneath the stump is thoroughly cleaned out of any material which may have dropped therein through the fashioning of the openings 9 and 11, and a suitable amount of combustible material 21 is placed in the fuel chamber beneath the stump. After the plate 15 and the tube 16 have been placed in position, as hereinbefore described, the back filling 17 is tamped into the shaft 3, to abut against the plate 15 and to surround the tube 16. The plate 15 is then drawn upwardly, and the tube is retracted, the trough 12 with its face plate 14 being inserted into the end of the hole 19 which is formed by the removal of the tube 16, the earth being tamped against the face plate 14, as hereinbefore described, to give to the mouth of the opening 19 the finished appearance indicated by the numeral 18 in Fig. 1. A burning brand is then introduced into one of the openings 11 or 19, preferably into the opening 19, since the latter opening terminates at its lower end relatively near to the bottom of the fuel chamber, while the opening 11 terminates at its lower end somewhat closer to the top of the fuel chamber. The combustible material 21 will thus be ignited, and the stump will be burned away gradually. As the stump burns, the lower portion of the stump will be attacked first, the flames thus eating upwardly, in their natural course, and entirely consuming the stump. As the stump burns, the incinerated portions thereof will drop downwardly into the fuel chamber beneath the stump, thus leaving the unconsumed portions of the stump exposed to the action of the flame.

Should the initial charge of combustible material fail to be sufficient to consume the stump entirely, additional supplies of combustible material may be introduced into the fuel-chamber, through any of the several openings which communicate therewith. The opening 19 which terminates adjacent the bottom of the fuel chamber, serves as an adequate air-inlet, the gases of combustion finding their way outwardly through the opening 11 or through the upright opening 9. Flat plates 20 or the like may be placed against the mouths of the openings 11 and 19 in order to control the draft, while the mouth of the opening 9 may be closed, either wholly or partially by a plug 22 or like device. Thus, the burning of the combustible material 21 within the fuel chamber may be regulated.

It is to be understood that the openings 11 and 19 may be positioned in any desired manner with respect to each other and with respect to the opening 9, and that the openings 11 and 9 may be opened and closed alternately, in order to draw the flames first in one direction and again in another, in order to consume that portion of the stump which appears to be burning slowest. By tamping the earth thoroughly about the stump, the flames will be compelled to eat their way up through the heart of the stump, thus preventing the exterior of the stump from being burned away first, causing the earth to fall in about the stump. It is to be noted moreover, that if the earth is moist in the first instance, or is thoroughly drenched, as hereinbefore described, the heat of the burning material in the fuel chamber will serve, not merely to consume the stump, but, as well to bake, and often to vitrify the inner surface of the chamber, thus rendering the same hard and incapable of caving.

Should the stump be sawed off close to the earth, it is obvious that the entire top of the stump may be covered with earth, without impairing the utility of the process, the flame thus being compelled to eat away the stump from the base, without forming additional draft openings through the stump. By this operation the stump may be thoroughly and effectively consumed.

It is to be noted that the process calls for no expensive tools, and a detailed description of the manner of forming the shaft 3 and the drift 4 need not be entered into. These matters will be adjusted by the operator to suit his own taste, and in conformity with the appliances which he may have at hand.

Ordinarily, in a season when the earth is wet, the excavations will be formed, and a large number of stumps put in condition for burning; and then, at an opportune season, the entire stumpage may be fired and left to be consumed.

The tamping of the earth about the entire circumference of the stump, above the normal level of the earth, may obviously be performed at such a step in the process, as may best suit the condition of the earth and the taste of the operator. The chamber 4 extends well below the surface of the ground, and into the sub-soil. The ashes, formed by the burning of the stump, will lie in the bottom of the chamber, and in the sub-soil. Rain-water and surface water will collect in the chamber 4 and leach the ashes, the filtrate seeping away into the sub-soil, to fertilize the same.

Having thus described the invention, what is claimed is:—

The herein described method of removing earth-embedded stumps, which consist in wetting the earth about and below the stump; sinking a shaft adjacent the stump, drifting laterally from the shaft to form a chamber beneath the stump, into which chamber the ashes of the stump are adapted to fall, placing combustible material in the chamber, sealing the chamber with earth, piercing the earth about the stump to form draft inlet and outlet openings; and igniting the combustible material to consume the stump and, by the heat thus generated, to bake the wet wall of the chamber, into a weight-resisting and heat-retaining condition.

In testimony that I claim the foregoing as my own, I have hereto affixed my signature in the presence of two witnesses.

WILLIAM W. POPE.

Witnesses:
A. L. PERRYMAN,
ALBERT W. WILLIS.

---

Copies of this patent may be obtained for five cents each, by addressing the "Commissioner of Patents, Washington, D. C."